March 16, 1965
A. J. MALAVAZOS
3,173,608
CALCULATING MACHINE
Filed Aug. 24, 1962
6 Sheets—Sheet 1
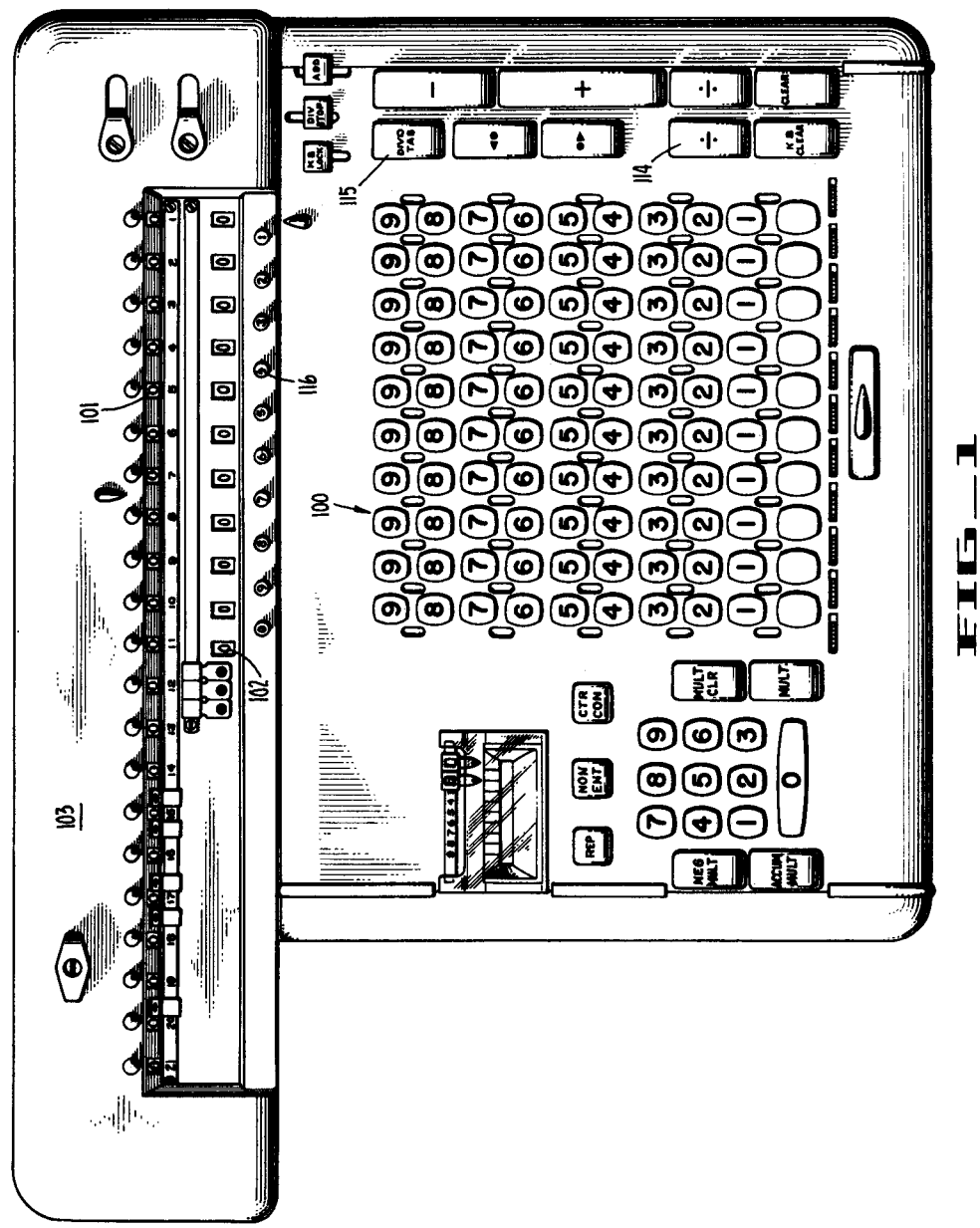
FIG_1

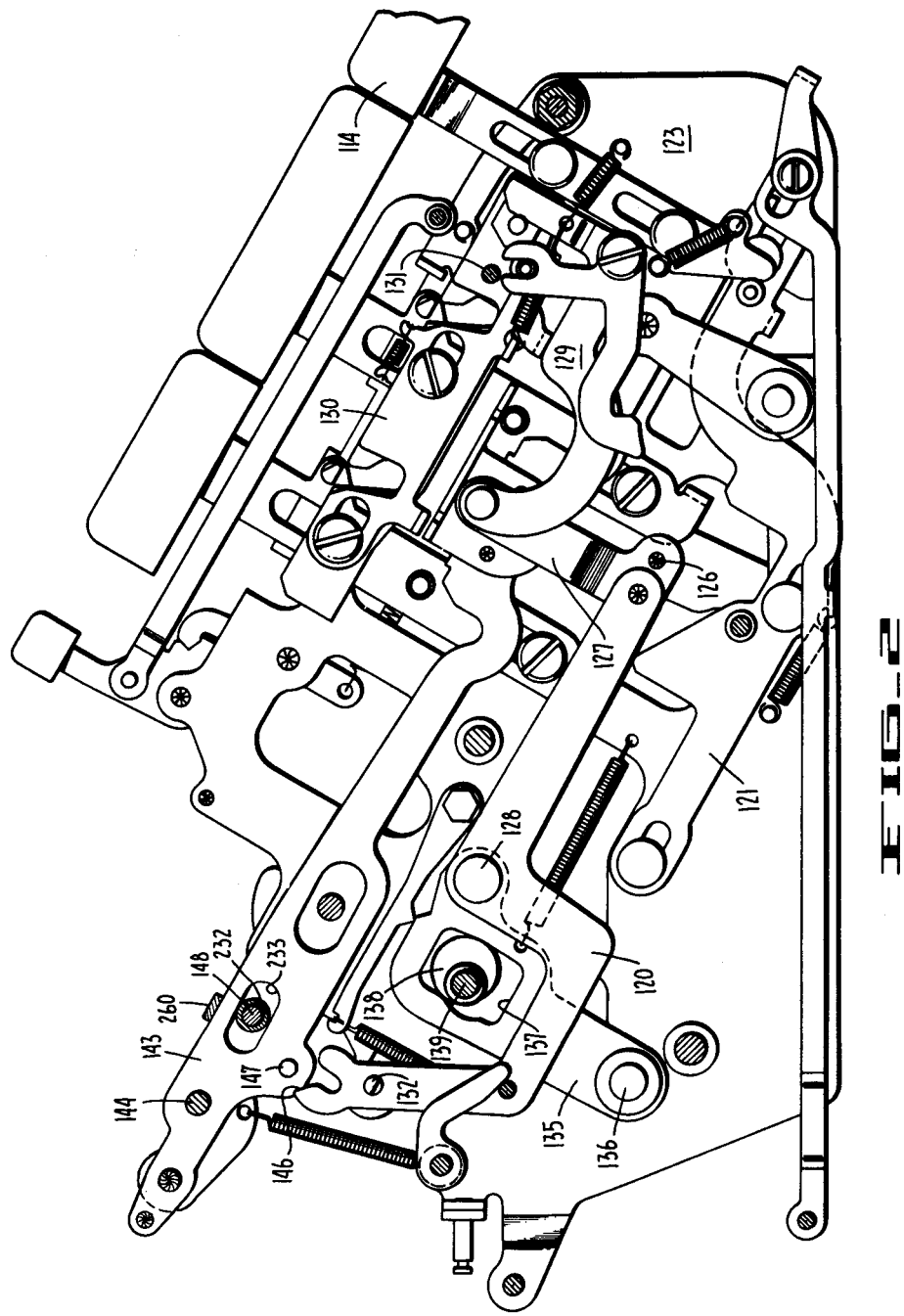

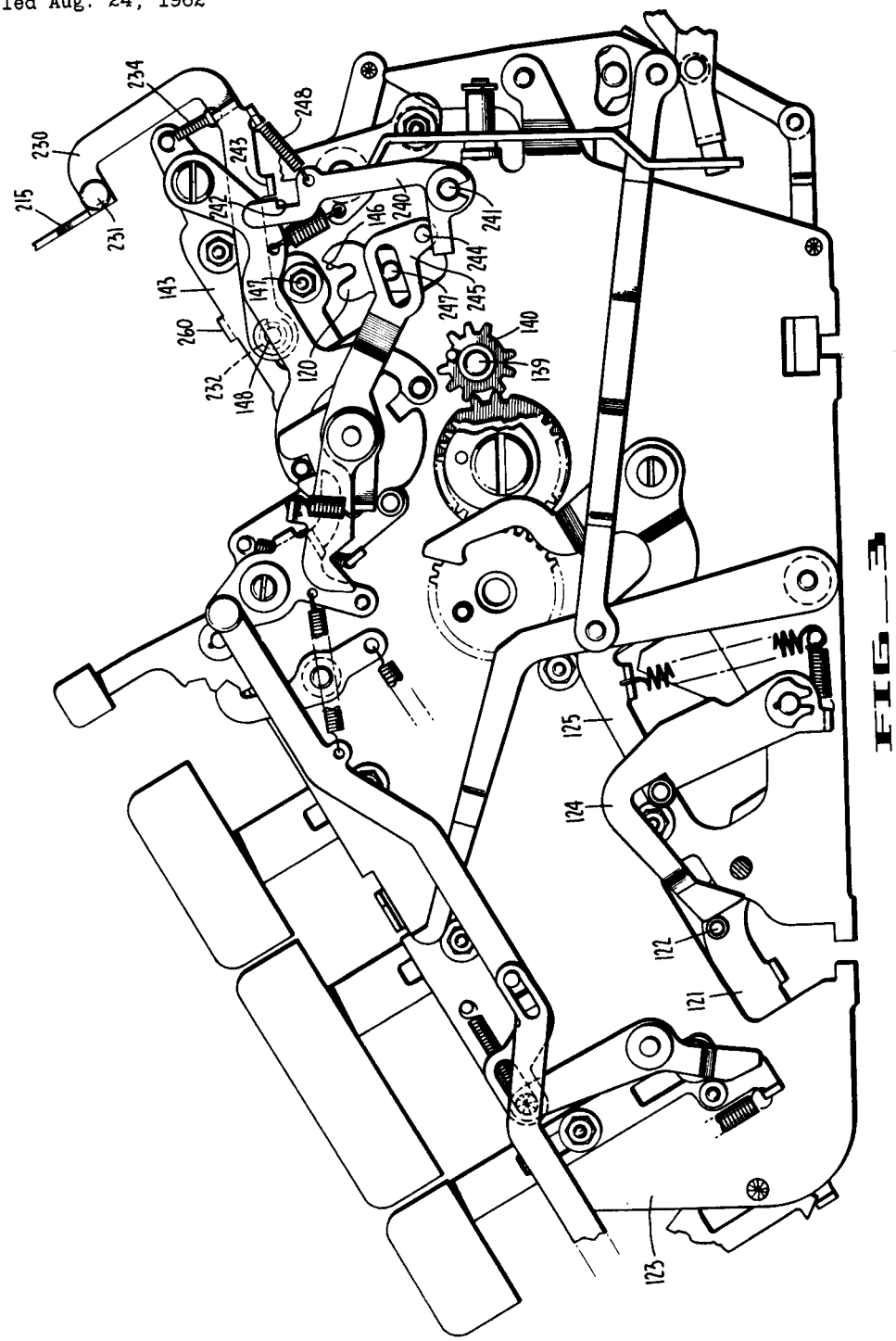

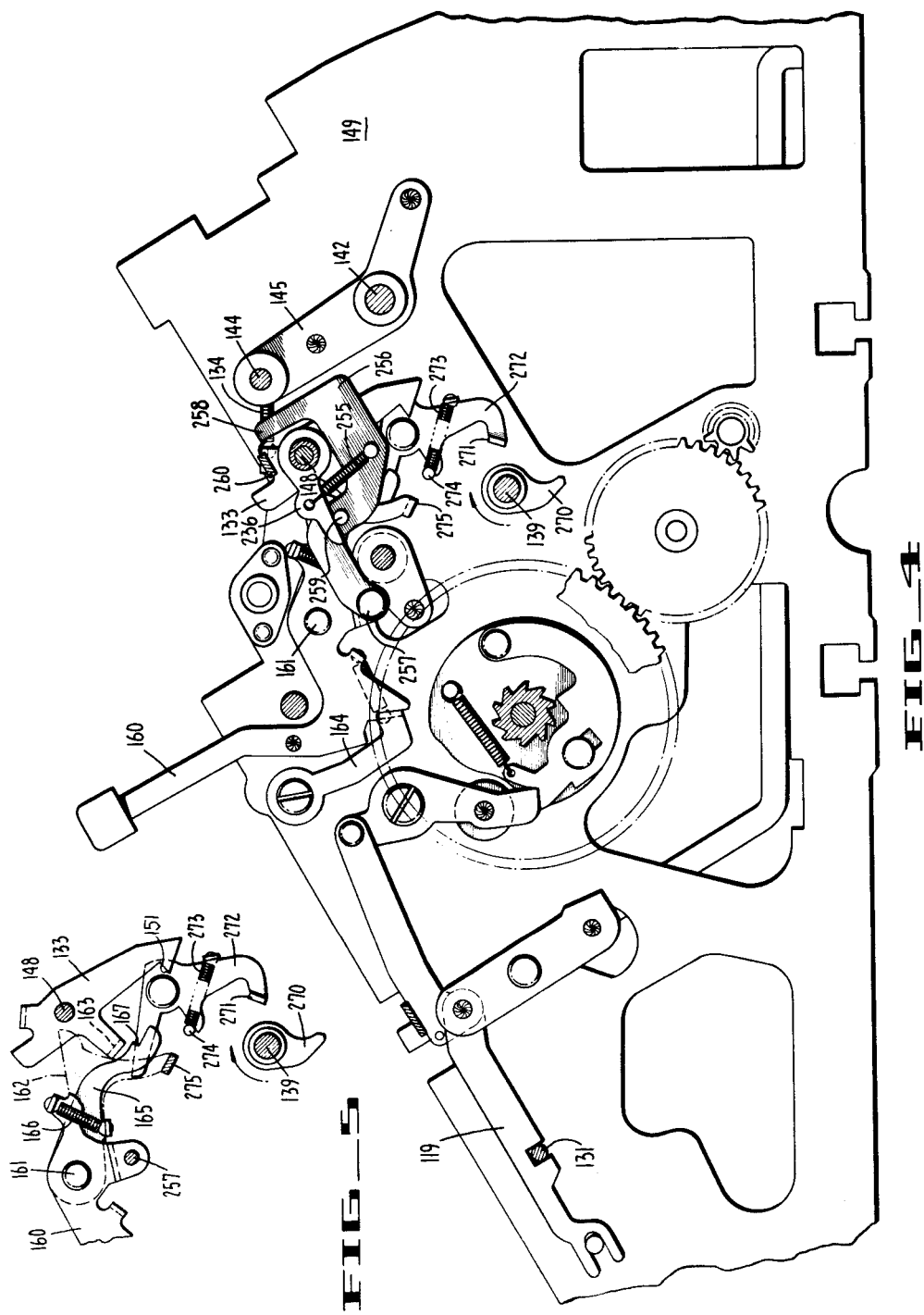

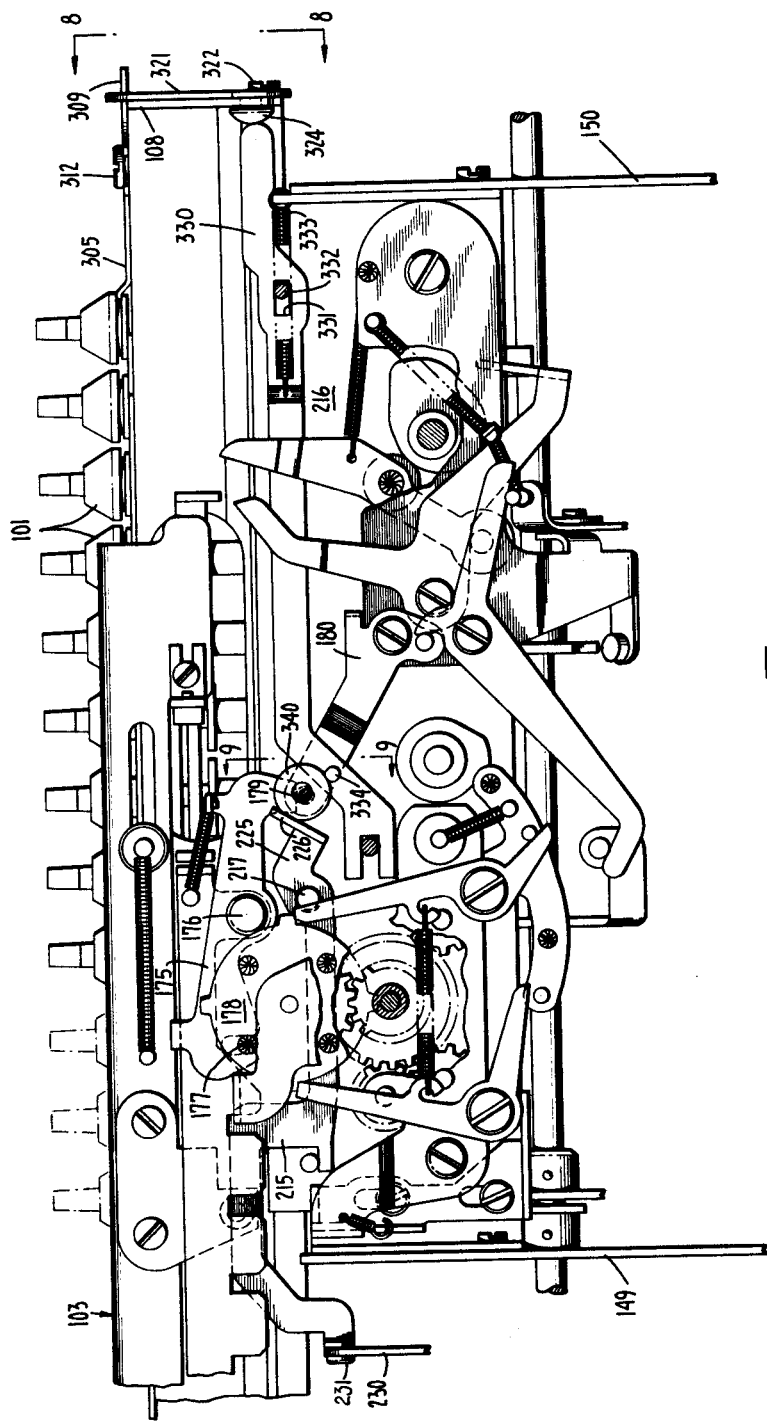

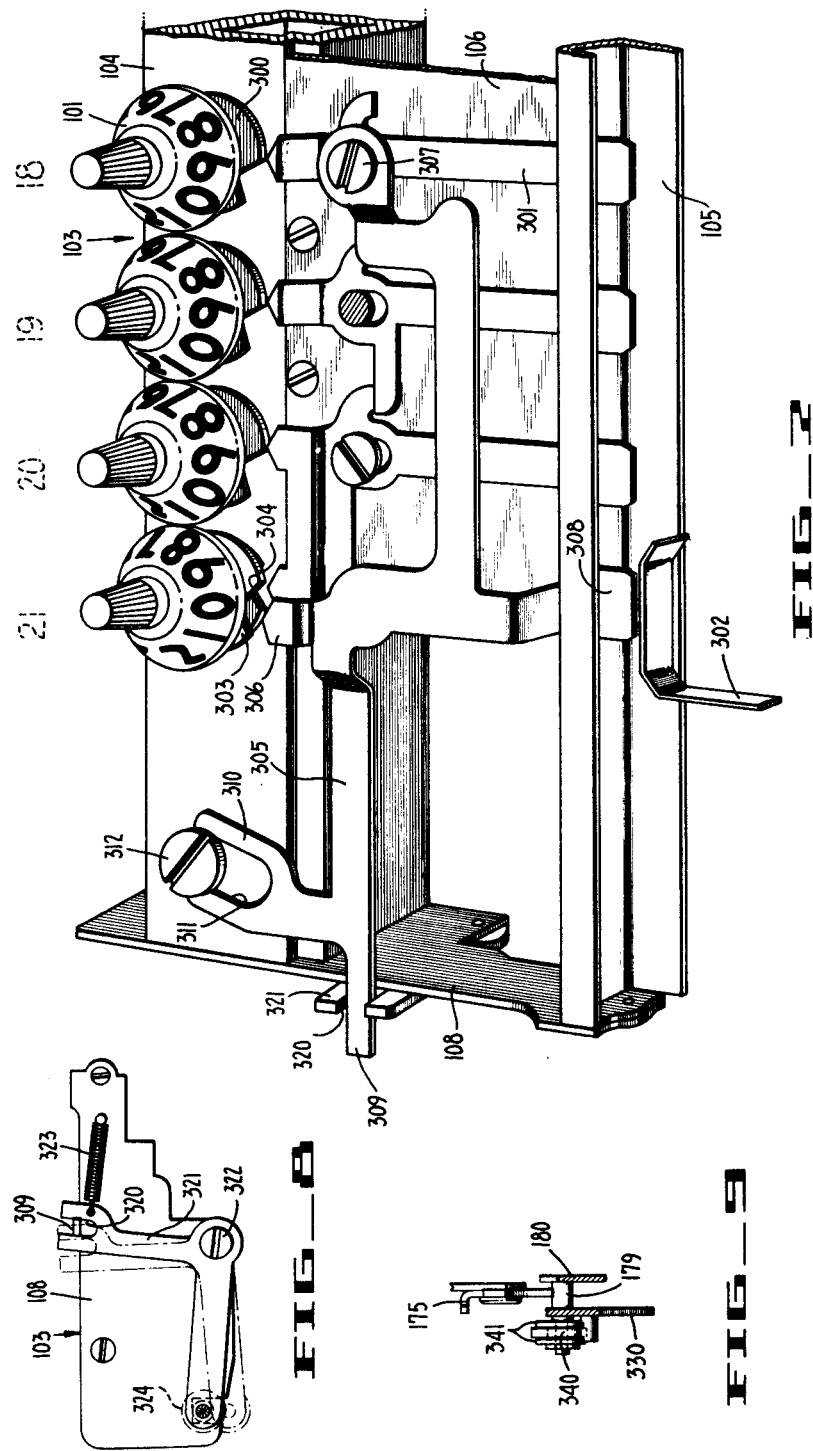

United States Patent Office 3,173,608
Patented Mar. 16, 1965

3,173,608
CALCULATING MACHINE
Arthur J. Malavazos, Hayward, Calif., assignor to
Friden, Inc., a corporation of California
Filed Aug. 24, 1962, Ser. No. 219,231
7 Claims. (Cl. 235—63)

The present invention relates to calculating machines and more particularly to a mechanism operative automatically to prevent a division operation whenever a value appears in the highest order of the dividend register and that order is beyond the reach of the divisor.

It is the primary object of the present invention to provide a mechanism for automatically blocking division when a value appears in a twenty-first order dividend register dial in the usual caculating machine in which the highest order of the divisor can only be effective in the nineteenth order dial. It has been customary to make calculating machines having a twenty-order accumulator register and a ten-order selection and actuating mechanism and a ten-position shiftable carriage. In such a machine there are nine ordinal shifts of the carriage from the home position shown in FIG. 1 of the drawings associated herewith, so that when the carriage is in the extreme right-hand position, the units order of the keyboard is aligned with the tenth order of the accumulator register and the tenth order of the selection mechanism is in alignment with the nineteenth order of the accumulator or dividend register. Heretofore it has been customary to provide a single, or twentieth order, overflow dial in order to handle factors higher than "9" in the accumulator dial aligned with the highest order of the selection mechanism. By "overflow dial" is meant one that can receive values from a tens-transfer from the adjacent lower order but cannot receive a value directly from the actuating mechanism. Associated with such an overflow dial it has been customary to provide an eleven-order counter register, so that if there was a value in the twentieth order, it could be used as a dividend if desired by the operator. In the present machine I am providing an additional overflow dial without changing the number of orders in the counter or the number of carriage shifts, for it has been found that in many problems the two overflow dials are desirable. However, it would not be practical to go to the additional cost of a machine with eleven shiftable positions and twelve orders in the counter or quotient dial. In a machine with the customary shifting mechanism and two overflow dials it is necessary to block operation of a division mechanism when a value stands in the highest order dial, as in all probability the quotient registered in the highest order of the counter would be inaccurate.

It is a primary object of the present invention to provide an improved automatic division stopping mechanism operable when the alignment of the dividend and divisor factors is such as to cause an inaccurate operation of the counter, or quotient, register.

For a better understanding of the present invention, together with other and further objects thereof, reference should be had to the following description of the preferred embodiment of the invention taken in connection with the accompanying drawings in which:

FIG. 1 is a plan view of the preferred machine in which my present invention is embodied.

FIG. 2 is a left side view of the right-hand control plate of the machine shown in FIG. 1, and shows particularly the digitation control mechanism and the major portion of the division programming mechanism.

FIG. 3 is a right side view of the right-hand control plate and shows additional features of the division control mechanism and also a portion of the division blocking mechanism of the present invention.

FIG. 4 is a right side view of the right-hand frame plate of the machine shown in FIG. 1 and shows additional portions of the division blocking mechanism.

FIG. 5 is a detail of the division blocking mechanism with certain overlying parts removed.

FIG. 6 is a rear view of the machine, showing certain details of the present invention.

FIG. 7 is an enlarged detail view of the left end of the register carriage, with cover removed, showing the four highest order accumulator dials and the mechanism of the present invention.

FIG. 8 is an end view of the carriage showing mechanism associated with that shown in FIG. 7, taken on line 8—8 in FIG. 6.

FIG. 9 is a cross-sectional view of a detail of a portion of the blocking mechanism shown in FIG. 6, such as taken along a vertical longitudinal plane indicated by the line 9—9 of FIG. 6.

For purposes of exemplification, I show and describe my invention in connection with the commercial calculating machine manufactured under the patent to Machado, No. 2,714,990, issued August 9, 1955, which, in turn, shows a machine such as that originally described in the patent to Friden, No. 2,229,889, dated January 28, 1941. It will be understood, however, that the invention is not limited to incorporation in such a machine for it can be incorporated in, or applied to, other commercial calculating machines on the market. It will be understood, therefore, that the machine shown in the accompanying drawings and described herein is for purposes of exemplification only, and that the invention is not limited thereto.

The mechanisms of said patents are well known and will not be shown and described herein except insofar as they are essential to the operation of the mechanism of the present invention. The general construction of the machine is described in the Machado patent, beginning with the heading "General Description" in column 2 and extending through the material included in the heading "Division Stop," ending at the bottom of column 10. It is only necessary to note that the machine is provided with a main keyboard 100 in which the operator sets the values which are to be registered in the accumulator dials 101, while the number of registrations is counted in the revolutions counter dials 102 (FIG. 1). Both the accumulator dials 101 and the counter dials 102 are mounted in a shiftable carriage 103. In a division problem it is customary to enter the dividend set in the keyboard 100 into the accumulator 101 positively by the depression of a dividend entry key 115 at any preselected ordinal position of the carriage 103 controlled by the depression of a tabulation control, or "tab," key 116. The divisor is then entered on the keyboard 100 and the divide key 114 is depressed. The depression of the divide key 114 closes the motor switch, operates the main clutch and conditions the machine for a division operation in which the divisor standing in the keyboard 100 will be repeatedly subtracted from the dividend standing in the accumulator dials 101 to an overdraft; the divisor is then added into the accumulator to restore the overdraft; and the carriage 103 shifted one order to the left, whereupon a new ordinal series of subtractive operations is initiated.

Division is controlled by the rocking of a control lever 120 (FIG. 2) which is indirectly rocked to its effective position by depression of the divide key 114. The depression of the key 114 translates a slide 121 rearwardly. A roller 122 (FIG. 3) on the right-hand side of the slide projects through an aperture in the right side control plate 123 and engages the front end of a division latch 124. The rocking of the latch 124 releases an actuating lever 125, the dropping of which engages a pin 126 (FIG.

2) carried by link 127 which is connected to the front end of the lever 120. Thus, the depression of link 127 rocks the control lever 120 about its pivot 128 and simultaneously rocks a bellcrank 129 to move a clutch control slide 130 rearwardly. A pin 131 carried by the slide 130 extends to the left and is embraced by a slot in a clutch control link 119 (FIG. 4). The operation of the clutch control link 119 and its effectiveness to cause operation of the main clutch and the closing of the power switch has been so often described that it is deemed unnecessary to repeat it at this time. Needless to say the rocking of the control lever 120 (FIG. 2) has been effective to initiate machine operation, which operation will be continued so long as the lever 120 is held in its rocked position.

The division control lever 120 is mounted on the pivot stud 128 that is carried by a cam follower arm 135 (FIG. 2). The follower arm 135 is pivotally mounted on the right control plate 123 by any suitable means, such as pivot stud 136.

The cam follower arm 135 is provided with a substantially rectangular aperture 137 which embraces a cam 138 mounted on a cam shaft 139. A mutilated gear 140 (FIG. 3), rigidly mounted on the right end of the cam shaft 139, is operative to rotate the shaft 139 and cam 138 through three increments of movement of 120° each in the three cycles of operation following an overdraft in the accumulator register dials 101. In those three cycles the following operations are performed: (1) in the first cycle, the divisor value standing in the keyboard is added back to restore the overdraft by shifting a digitation control gate, shown in the above-mentioned patent, No. 2,714,990, from its subtractive to its additive position; (2) during the second cycle, the digitation control gate is returned to its neutral position and the carriage shifting mechanism is operated to shift the carriage and register one order to the left; and (3) in the third cycle the mutilated gear 140 is returned to the normal position shown, thereby restoring the digitation control gate to its subtractive position to initiate a continuous series of subtractions in the lower order.

The digitation control gate is rigidly mounted on a control shaft 142 (FIG. 4). In most operations the positioning of the shaft 142 and gate is secured by operation of a control bar 143 (FIG. 2) which is translated rearwardly in additive operation and forwardly in subtractive. A pin 144 adjacent the rear end of this bar pivotally engages a bearing in an arm 145 (FIG. 4) affixed to shaft 142 to rock the digitation control gate. In division operations, the lifting of the rear end of the control lever 120 (FIG. 2) is effective to move the digitation control bar 143 forwardly to its subtractive position. This result is secured by means of a cam face 146 and notch in the rear end of the control lever 120 which engages a pin 147 on the digitation control slide 143.

When rocked to its operative position (from the depression of the division key 114 and the operation of the spring-powered actuating arm 125, FIG. 3, upon pin 126), the lever 120 (FIG. 2) is latched in its operative position. The customary latch comprises a half-round stud 132 riveted to, or otherwise rigidly secured on, the rear end of the lever 120 and a cooperating latch 133 (FIGS. 4 and 5) which is pivotally mounted on a shaft 148 and biased to an operative position by a spring 134. It can be noted that the latching of the control lever 120 in its operative position (clockwise from that shown in FIG. 2), through link 127 and bellcrank 129, holds the clutch-operating slide 130 in its effective position and hence keeps the machine in continuous cycles of operation. This operation continues until the latch is released by means of a customary latch-releasing mechanism (not shown herein) which is effective when the division operation is completed in the home, or extreme left-hand, position of the carriage, or by means of a manually operated division stop key which will hereinafter be explained.

The operation of the machine in division has been described adequately in prior patents, such as Friden, No. 2,229,889, issued Jan. 28, 1941; Friden, No. 2,229,890, also issued Jan. 28, 1941; or Friden, No. 2,37,981, issued Aug. 31, 1943. In view of the fact that the division mechanism and the details of its operation are unnecessary to an understanding of the present invention, it is believed that the above sketchy description is sufficient for those skilled in the art.

For many years it has been customary to provide the machines manufactured under the patents above-mentioned with a manually controlled division stop mechanism of the type shown in the patent to Friden, No. 2,327,981 (FIG. 4 thereof) or in the patent to Machado, No. 2,714,990 (FIG. 8 thereof). This mechanism comprises a control lever 160 (FIG. 4) which is pivotally mounted on the right side frame plate 149 by any suitable means, such as pivot stud 161. The rear end of the lever 160 is formed with a rearwardly extending finger 162 (shown in phantom in FIG. 5) which overlies an ear 163 formed on a forwardly extending projection of the latch 133. It is apparent that rearward rocking of the control lever 160 (clockwise in FIGS. 4 and 5) causes the camming finger 162 to engage ear 163 and hence rocks the latch 133 (counter-clockwise in these figures) to its releasing position. Thereupon the control lever 120 is immediately released, and the machine stops at the end of that cycle of operation. It can be mentioned that while the stop lever 160 can be latched in either of its two other positions, it is not detented in this position just described, so will be returned to its normal inoperative position immediately upon its release by the operator.

The stop lever 160 can also be rocked from its normal inoperative and intermediate position shown in FIGS. 4 and 5 forwardly (counter-clockwise in these figures), in which position it will be detented by the usual detent 164. In this position the stop lever sets a control mechanism which is effective to stop the machine at the end of the shifting cycle of the three-cycle operation that occurs in division between orders. Stopping of the machine at this point gives a true quotient in the register dials to that ordinal position, for the machine has continued operation to the overdraft, the addition of the divisor to correct the overdraft, and a shifting of the register to the next ordinal position. The mechanism for this delayed stop is shown particularly in FIG. 5 and comprises an arm 165 pivotally mounted on the pivot stud 161. A spring 166 tensioned between ears formed on the arm 165 and on the rear end of stop lever 160 biases the arm 165 to follow rocking of the stop lever 160. The rear end of the pivotally mounted arm 165 is formed with a shoulder 167 adapted to engage the ear 163 on latch 133. When the stop lever 160 is pulled forward (counter-clockwise in FIGS. 4 and 5) it is resiliently latched in that position by the detent 164. The arm 165, from the force of spring 166, follows the rocking of the lever 160 until its upper edge engages the ear 163. At that point the shoulder 167 will not engage the ear 163, and further movement of arm 165 is blocked. However, when the mutilated program gear 140 is driven to its first position after the overdraft, the rotation of the cam 138 (FIG. 2) rocks follower arm 135 (counter-clockwise in this figure) and hence translates the control lever 120 rearwardly to set the digitation control gate for additive operation, as is more fully explained in Patent No. 2,714,990, above-mentioned. The rearward movement of the digitation control bar 143, resulting from this operation, obviously rocks the latch 133 (counter-clockwise in FIG. 5), although it still remains latched upon pin 132. When this occurs, the ear 163 rocks into registry with the shoulder 167, and the latch 133 is thereby latched in this rearward, counterclockwise position. Then, at the end of the additive correcting cycle, the second phase of rotation of the mutilated control gear 140 rocks the cam follower arm 135 and control lever 120 to an intermediate, or shift-controlling, position, thereby pulling the digitation control bar 143 forwardly to the intermediate position shown. The forward movement of the control lever 120 (to the right in FIG. 2) pulls the latching pin 132 from engagement with shoulder 151 of latch 133, as the latch is held in its rearward or counter-clockwise position by latch 165. In this fashion the control lever 120 is released and the machine comes to rest at the end of the shifting cycle.

It should perhaps be mentioned at this point that it has been customary to provide calculating machines made under the patents heretofore mentioned with a mechanism effective to automatically terminate a right shifting operation whenever the carriage reaches an extreme right-hand position, even though the shift control mechanism is held operative. Such a situation occurs when the operator holds the right shift key 113 (FIG. 1) depressed, or, in division, when the usual dividend divisor aligner mechanism is unable to align the two factors because they have been misplaced in the dividend register and selection mechanism. Such a mechanism has included a pawl 175 (FIG. 6) pivotally mounted on the carriage frame 103 by some suitable means, such as pivot stud 176. This pawl is rocked by one of the customary shift pins 177 carried by the shift plate 178. As the shifting mechanism per se is no part of the present invention, it will not be described herein, but reference can be made to the patent to Matthew, No. 2,636,678, issued April 28, 1953, for a full description thereof. When so rocked, the override pawl 175 engages a pin 179 on a bellcrank 180, rocking the latter (counter-clockwise in FIG. 6). When the carriage is shifted to the extreme right-hand position (to the extreme left as shown in FIG. 6) and the shifting mechanism continues operation, the rotation of the shifting plate 178 rocks the override pawl 175 and that, in turn, rocks bellcrank 180. In view of the fact that this override mechanism is fully shown and described in the patent to Machado et al., No. 2,653,765, issued September 29, 1953, and the mechanisms operated thereby have no connection with the mechanism of the present invention or its operation, it will not be further described. It should be realized that in the machine of the Friden patents above-mentioned, and especially the patent to Machado, No. 2,653,765, the operation of the division key 114 will always result in the shifting of the carriage 103 to the extreme right-hand position so long as a value is registered in any of the three left-hand, or three highest orders of the accumulator, or dividend register.

It can, however, be noted that this override mechanism is useful in connection with the dividend-divisor aligning mechanism described in the Machado patent just mentioned, and will be operative whenever the carriage 103 is in its extreme right-hand position (to the extreme left in FIG. 6) and a further shift to the right is attempted with the carriage in that position, as will be required when the dividend and divisor have not been aligned with the carriage in that extreme position. It will be obvious that this condition must exist when values stand in the twentieth and twenty-first orders of the accumulator register dials 101 even though the highest order of the divisor is in the highest order of the keyboard 100. When the highest order of the dividend stands in the twentieth order of the accumulator register dials 101, division can still take place because the eleventh order counter dial permits the accumulation of a true quotient. However, when the highest order of the dividend stands in the twenty-first order, accuracy is no longer possible and it is desirable to terminate the division operation before it can be started, and in this case, the override mechanism will always be operative.

My present invention relates to a means for sensing whether a value other than "0" is registered in the twenty-first order dial, and a mechanism operated thereby to operate the division stop previously described. The mechanism for sensing the value registered in the highest, or twenty-first order, is best shown in FIG. 7. Incidentally, digitation (i.e., actuation by the machine's actuating mechanism) is possible only to the nineteenth order dials—the twentieth and twenty-first order dials can only receive values by tens-transfers. It is seen by reference to this figure that each of the register dials 101 has a zero sensing cam 300 associated therewith—the cam 300 actually being rigidly attached to the same shaft to which each dial 101 is affixed. These cams are necessary to the operation of the dividend-divisor aligning mechanism described in the patent issued to Machado et al., No. 2,653,765, and while not important to the present invention, they are so closely positioned to the mechanism of my invention that they should be mentioned. Associated with these zero cams is a series of sensing fingers 301 which are slidably mounted in slots in the front carriage rail 105 and on screws 307 mounted on the frame plate 106 extending between the carriage rail 105 and the carriage frame bar 104. These sensing fingers 301 are sequentially operated by an operating slide 302 of the dividend-divisor aligning mechanism, as the carriage is shifted to the right to each ordinal position. The means for resiliently operating the slide 302 to actuate each sensing finger 301 to detect an "0" or a value position in the corresponding dial 101 is fully described in the patent to Machado et al., No. 2,653,765 and will not be further described, but it should be noted that it is operated in each ordinal position of the carriage during an aligning operation.

In addition to the cam 300 on the shaft of the twenty-first order dial, the shaft also carries a second zero sensing cam 303. This cam is provided with a notch, or depression, 304, so positioned on the cam as to be engaged by a sensing nose 306 formed on a sensing lever 305 when its dial registers a value of "0". Preferably, the sensing lever 305 is pivotally mounted on the screw 307 which holds the eighteenth order sensing finger 301 in proper alignment. The sensing lever 305 is provided with a forwardly extending projection 308 which passes through a slot (not shown) in the front guide rail 105 and is adapted to be engaged by the operating slide 302 when it is operated with the carriage in the extreme right-hand position. Thus, the operation of the actuating slide 302 with the carriage in the extreme right-hand position rocks the lever 305 (clockwise) if the zero notch 304 is in alignment with the nose 306 at that time. If a value stands in the twenty-first order dial, then, of course, the nose 306 will engage the periphery of the cam 303, in which case the rocking of lever 305 is blocked and consequently the attempted operation of the actuator slide 302 is prevented—as is adequately described in the Machado et al. patent just mentioned. It can be noted, as was fully described in the Machado et al. patent previously mentioned, that the operating slide 302, in the present invention, is located two orders to the left of the dial 101 aligned with the highest order of the keyboard 100 (which, in the present machine, is shown as being the dial identified by the phantom number 19).

The lever 305 carries a leftwardly extending tongue 309 which projects beyond the end plate 108 of the carriage 103. In order to prevent twisting, or warping, of the lever 305, it is desirable to provide a guiding projection 310 formed with an angularly disposed slot 311 which engages a screw stud 312 mounted in carriage frame bar 104.

The leftwardly projecting tongue 309 of the lever 305 is embraced within a slot 320 formed in the upper end of a bellcrank lever 321 (see also FIG. 8) that is pivotally mounted on the end plate 108 of the register carriage 103 by any suitable means, such as screw stud 322. The bellcrank 321 is resiliently biased to the clockwise position shown in FIG. 8 by a suitable spring 323, tensioned between a seat in the upper arm of the bellcrank and a stud on the carriage end plate 108. The rear end of the horizontally extending leg of the bellcrank carries a button, or rounded stud, 324 (best shown in FIG. 6) which projects through an aperture in the end plate 108.

It will be obvious that when the actuating slide 302 is operative in the twenty-first order, it will endeavor to push the sensing lever 305 rearwardly (to the left in FIG. 8). If a value other than "0" is registered in the twenty-first order dial, the sensing lever must remain substantially in the position shown, and hence the bellcrank 321 will remain in the full line position shown in FIG. 8. However, if the twenty-first order dial stands at "0," the sensing lever 305 can move rearwardly, and in that event, the bellcrank 321 is rocked (counterclockwise in FIG. 8) to the phantom line position shown.

A control slide 330 (FIG. 6) is slidably mounted on the rear bearing plate 216 by any suitable means, such as slots 331 in this slide, embracing large-headed studs 332 rigidly affixed to the bearing plate. This control slide is resiliently biased to the left (to the right in FIG. 6) by a spring 333 tensioned between a seat formed in an offset portion of the slide and a seat in the left side frame plate 150. Adjacent its right end (to the left in FIG. 6), the control slide 330 carries a pin 334 rigidly secured thereon. Normally (whenever the carriage 103 is in any position except the extreme right-hand position, or the sensing lever 305 senses a nonzero condition in the extreme position) the control slide 330 is held to the right (to the left in FIG. 6) by button 324 on bellcrank 321. However, when the bellcrank 321 is rocked (counter-clockwise in FIG. 8) in sensing a zero condition in the twenty-first order, the control slide 330 can move to the right under the force of spring 333.

The pin 334 is adapted to engage a washer 340 (FIGS. 6 and 9) that is very loosely mounted on the pin 179. This washer has an inside diameter considerably in excess of the diameter of the pin 179, as is best shown in FIG. 6, and is held in proper position on the pin 179 by suitable washers 341 (shown in FIG. 9) which are rigidly secured to the pin 179, thereby preventing the washer 340 from sliding along the pin, or twisting to an angle other than the perpendicular position shown. This washer is adapted to engage a bracket, or shoe, 226 on the leftwardly extending leg 225 (to the right in FIG. 6) of a division stop lever 215. Preferably this division stop lever is similar to that shown in the copending application of myself and Jamieson, being pivotally mounted on the rear bearing plate 216 by any suitable means, such as pivot stud 217. When the control slide 330 is in the normal, or blocking position shown in FIG. 6, the pin 334 engages the washer 340. If the override pawl 175 is operated in this condition, the downward movement of the pin 179 resulting therefrom, forces the washer 340 against the bracket 226 on the left-hand end of the actuator lever 215, thereby rocking the lever (counterclockwise in this figure). On the other hand, if the control slide 330 is enabled to move to the left (to the right in this figure) as a result of the rocking of the bellcrank 321, to remove button 334 from its blocking position, the pin 334 will have been shifted to the left (to the right in this figure). At this time the washer 340, being so loosely mounted on pin 179, will not be forced to operate the division stop actuating lever 215, for in that event the pin 334 will not block movement of the washer 340. The arm 215 extends to the right (to the left in FIG. 6) to a point to the right of the right side frame plate 149, as shown. A second arm 230 is pivotally mounted on the right end (left end in FIG. 6) of the division stop lever 215 by any suitable means, such as pivot pin 231. The front end of this second arm 230 is rigidly mounted on a sleeve 232 (see FIG. 3) rotatably mounted on the stub shaft, or pin, 148. Both the pin and sleeve extend through a slot 233 in the digitation control bar 143, as shown in FIG. 2. The arm 230, and consequently the actuating arm 215, are held in the inoperative raised position by some suitable means, such as a spring 234 (FIG. 3) tensioned between a spring seat in the arm 230 and a stud on some suitable member, such as the digitation control bar 143. To the left of the control bar, 143, the sleeve 232 carries a forwardly extending arm 236 (FIG. 4). Thus, in effect, the arm 230, sleeve 232 and arm 236 form a bellcrank which is rocked (clockwise in FIGS. 3 and 4) whenever the actuating lever 215 is rocked by the operation of the override pawl 175 upon washer 340 when that washer is locked in its effective position by slide 330.

When the arm 230 is so rocked, it is latched in its operative position by means of a bellcrank latch arm 240 (FIG. 3) which is pivotally mounted on the right side control plate by some suitable means, such as a pivot stud 241. The upper end of the latch arm 240 is formed with a shoulder 242, adapted to engage an ear 243 formed on the second arm 230. Normally, the latch is held in an inoperative position by means of a tail of the latch arm engaging a pin 244 carried on a counterlocking lever 245. This counterlocking lever 245 and its operation is described in a number of patents, such as the patent to Friden, No. 2,294,111 of August 25, 1942, so it is believed unnecessary to describe it in detail. However, it should be noted that a slot in the rear end of the counterlocking lever embraces a pin 247 carried by the division control lever 120. It is apparent that when the division control lever 120 is lifted to engage the pin 147 of the digitation control bar 143, the counterlocking lever 245 is rocked (counter-clockwise in FIG. 3). Such rocking of the counterlocking lever 245 releases latch 240 to the force of a spring 248 tensioned between a spring seat in the latch and another in the secondary operating arm 230. Thereupon, the edge of the latch arm 240, above the shoulder 242, will engage the ear 243. Then, when the arm 230 is depressed, the shoulder becomes effective to latch the arm 230 in the depressed position.

In view of the fact that arm 230, sleeve 232 and arm 236 form a bellcrank, it is clear that when the arm 230 is rocked to its operative position (clockwise from the position shown in FIG. 3) and latched in that position, the arm 236 (FIG. 4) is also rocked in the same direction and held in the rocked position. This arm is connected, by means of a spring 255, to an arm 256 which is pivotally mounted upon the division stop lever 160 by some suitable means, such as pivot pin 257. This pin is so located on the arm 160 that when the arm 256 is urged rearwardly, such movement pulls the division stop arm 160 to the delayed stop position previously described. The arm 256 is formed to go around the pin 148 and sleeve 232, with an upstanding projection, or nose, 258 at its rear end. A pin 259 on arm 256 prevents lifting of the arm by spring 255 beyond the position shown, as it (the pin) contacts the under edge of arm 236. Thus, when the arm 236 is in a normal position shown in FIG. 4, the arm 256 is held in a depressed and inoperative position, but as soon as the arm 236 is rocked, the arm 256 is resiliently lifted. Associated with the nose 258 is an ear 260 formed on the digitation control slide (also shown in FIGS. 2 and 3), the ear being so positioned on the bar 143 as to lie immediately in front of the nose 258, and above the nose 258 when it is in its depressed position but to engage the nose when it is raised.

It will be recalled that in division operations the digitation control slide 143 is normally in the forward, or subtractive position (to the right in FIG. 2 or to the left in FIGS. 3 and 4). Hence, during such subtractive operations, the ear 260 will be moved further way from nose 258 and the arm 256 is free to be lifted by spring 255 when arm 236 is operated. It will also be recalled that in the first cycle of the interordinal program, the digitation control slide 143 is moved rearwardly (to the left in FIG. 2 and to the right in FIGS. 3 and 4) to the additive position in order to correct the overdraft. Such movement of the control bar 143 causes the ear 260 to engage the nose 258 of arm 256, and hence pulls it rearwardly. This sets the division stop to the delayed stop position and hence the division operation will be terminated by the customary division stop mechanism at the end of the second cycle or shifting phase of the interordinal operation.

It can be noted that the division stop mechanism is restored to its neutral, or inoperative, position at the end of the interordinal program operation by means of a cam 270 (FIGS. 4 and 5) mounted on the shaft 139 to the left of the mutilated control gear 140. It will be recalled that the shaft 139 is given three increments of movement of 120° each in the three interordinal program cycles in division, so that the cam 270, which is shown in these figures in its normal or inoperative position of the shaft 139, will engage an ear 271 on a cam follower arm 272 in the third cycle. The cam follower is biased to the position shown in these figures by a spring 273 tensioned between a seat on the lower portion of the follower and a stop pin 274. When the ear 271 is engaged by the cam 270, the follower arm 272 is rocked (counter-clockwise in these figures). Thereupon the forwardly extending arm of the bellcrank follower 272 engages an ear 275 on a projection from the stop lever 160. Thus, the rocking of the bellcrank follower 272 from operation of cam 270, rocks the lever 160 (clockwise in FIGS. 4 and 5) to restore it to its neutral, or inoperative, position.

It is thus apparent that the mechanism just described is effective to sense whether a "0" or a digital value stands in the twenty-first order dial. If it senses a "0", movement of slide 330 by its spring is permitted. Consequently the washer 340 is loose on its pin 179, and the rocking of the override pawl 175 is ineffective to rock division stop arm 215. If, on the other hand, the sensing lever 305 senses any digital value, the button 324 will remain in the position shown, hence blocking movement of control slide 330. In that event, the washer 340 is held by pin 334 on slide 330, and the rocking of the override pawl is effective to rock the stop lever 215. In the machine shown herein as the preferred embodiment of my invention, the customary dividend-divisor aligning mechanism will proceed with the three-cycle operation at this point, and the division stopping arm 160 will be rocked to its delayed stop position.

It will be manifest to those skilled in the art that while the present invention has been shown and described as embodying a machine of the type disclosed in the patents above-mentioned, this invention is not limited to incorporation in such a machine but may be applied to other commercial calculating machines on the market.

I claim:
1. In a calculating machine having a selection mechanism and an ordinally arranged differential drive means controlled thereby, an ordinally arranged dividend register, means for shifting the relative ordinal positions of the actuating mechanism and the register whereby the differential drive means can be effective in various orders of the dividend register, said register containing at least one overflow order at the left-hand end thereof not operable by the differential drive means, and an automatic division mechanism for dividing a dividend in said dividend register by a divisor in said selection mechanism, the combination which comprises means for sensing a value or nonvalue in said overflow order, a means for operating said sensing means, and means operated by said sensing means when sensing a value in said overflow order for disabling operation of said division mechanism.

2. In a calculating machine having a selection mechanism and an ordinally arranged differential drive means controlled thereby, an ordinally arranged dividend register, means for shifting the relative ordinal positions of the actuating mechanism and the register whereby the differential drive means can be effective to operate various orders of the dividend register, said register containing at least two overflow orders at the left-hand end thereof not operable by the differential drive means, and an automatic division mechanism for dividing a dividend in said dividend register by a divisor in said selection mechanism, the combination which comprises means for sensing a "0" or non-zero value in the highest overflow order, a means for operating said sensing means, and means jointly operated by said shifting means and said sensing means when sensing a non-zero value in said overflow order for disabling operation of said division mechanism.

3. In a calculating machine having a selection mechanism and an ordinally arranged differential drive means controlled thereby, an ordinally arranged dividend register, means for shifting the relative ordinal positions of the actuating mechanism and the register whereby the differential drive means can be effective to operate various orders of the dividend register, said register containing at least one overflow order at the left-hand end thereof not operable by the differential drive means, a shift terminating mechanism operable by said shifting means upon shifting to an extreme higher ordinal position, an automatic division mechanism for dividing a dividend in said dividend register by a divisor in said selection mechanism, an automatic dividend-divisor aligning mechanism for properly aligning a dividend and a divisor to properly divide the dividend by the divisor, and a division stopping mechanism operative to terminate machine operation in division, the combination which comprises means for sensing a value or a "0" in said overflow order, a means operated by said dividend-divisor aligning mechanism for operating said sensing means whenever the differential drive means is operative in the highest order in which it can be effective, and means operated jointly by shift terminating mechanism and said sensing means when sensing a value for operating said stopping mechanism.

4. In a calculating machine having a selection mechanism and an ordinally arranged differential drive means controlled thereby, a dividend register containing ordinally arranged registering members, means for shifting the relative ordinal positions of the differential drive means and the register whereby the differential drive means can be effective to operate various ordinal members of the dividend register, said register containing at least one overflow member at the left-hand end thereof not operable by the differential drive means, an automatic division mechanism for dividing a dividend in said dividend register by a divisor in said selection mechanism, and a division stopping mechanism operative to terminate machine operation in division, the combination which comprises means for sensing a value or nonvalue in said overflow member, means for operating said sensing means whenever the differential drive means is operative in the highest orders in which it can be effective, and means operated by said sensing means when sensing a value for operating said stopping mechanism.

5. In a calculating machine having a frame, a carriage shiftable to said frame, an ordinally arranged accumulator in said carriage, an indexing mechanism, a differential drive means controlled by said indexing mechanism for operating said accumulator, at least one of the orders of said accumulator lying in a higher ordinal position than the highest order of the differential drive means when the carriage is shifted to an extreme right-hand position, means for shifting said carriage, a shift terminating mechanism operative upon the attempted shifting of said carriage to the right after reaching the extreme right-hand position, an automatic division mechanism operative to control operation of said differential drive means and said shifting means to divide a dividend in said accumulator by a divisor in said indexing mechanism, a detent means for maintaining said division mechanism in its operative condition, a division stopping mechanism effective to release said detent means during the operation of the shifting means in the order in which the machine is operating at the time the stopping mechanism is operated, and a manual means for operating said stopping mechanism, the combination which comprises a means for sensing a "0" or a value position of the highest order of said accumulator, means for operating said sensing means when the carriage is in its extreme right-hand position, an interponent normally conditioned for operation by said shift terminating mechanism and movable to an inoperative position by the sensing means when sensing a "0" condition of said highest order of said accumulator, and means adapted to be operated by the interponent upon operation of said shift terminating mechanism to operate said division stopping mechanism.

6. In a calculating machine having a shiftable carriage, means for shifting said carriage, an ordinally arranged accumulator in said carriage, an indexing mechanism, a differential drive means controlled by said indexing mechanism for operating said accumulator, at least one of the orders of said accumulator lying in a higher ordinal position than the highest order of the differential drive means when the carriage is shifted to an extreme right-hand position, an override mechanism operative upon the attempted shifting of said carriage to the right after reaching the extreme right-hand position, an automatic division mechanism operative to control operation of said differential drive means and said shifting means to divide a dividend in said accumulator by a divisor in said indexing mechanism, a division stopping mechanism effective to terminate a division operation, the combination which comprises a means for sensing a "0" value in the highest order of said accumulator, means for operating said sensing means when the carriage is in its extreme right-hand position, a blocking member normally in a blocking position and movable by the sensing means when sensing a "0" condition of said highest order of said register to a nonblocking position, an interponent held in an operative position by the blocking member when the latter is in its blocking position and operable by said override mechanism, and a member adapted to operate said division stopping mechanism and to be operated by said interponent upon operation of said override mechanism and the blocking of the interponent by the blocking member.

7. In a calculating machine having a frame, a carriage shiftable relative to said frame, means for shifting said carriage, an ordinally arranged accumulator in said carriage, an indexing mechanism, a differential drive means controlled by said indexing mechanism for operating said accumulator, at least one of the orders of said accumulator lying in a higher ordinal position than the highest order of the differential drive means when the carriage is shifted to an extreme right-hand position, an override mechanism operative upon the attempted shifting of said carriage to the right after reaching the extreme right-hand position, an automatic division mechanism operative to control operation of said differential drive means and said shifting means to divide a dividend in said accumulator by a divisor in said indexing mechanism, a detent means for maintaining said division mechanism in its operative condition, a division stopping mechanism effective to release said detent means during the operation of the shifting means in the order in which the machine is operating at the time the stopping mechanism is operated, and a manual means for operating said stopping mechanism, the combination which comprises a means for sensing a "0" or alternatively a value position, of the highest order of said accumulator, means for operating said sensing means when the carriage is in its extreme right-hand position, a blocking member normally in a blocking position and movable by the sensing means when sensing a "0" condition of said highest order of said accumulator to a nonblocking position, an interponent operated by said override mechanism, said interponent being held in an operative position by the blocking member when the latter is in its blocking position, and a member adapted to be operated by the interponent upon operation of such override mechanism and the blocking of the interponent to operate said division stopping mechanism.

References Cited by the Examiner
UNITED STATES PATENTS 2,365,507 12/44 Allen.
2,956,742 10/60 Coulin.

LEYLAND M. MARTIN, *Primary Examiner.*

LEO SMILOW, *Examiner.*